(12) United States Patent
Peiris et al.

(10) Patent No.: US 10,819,671 B2
(45) Date of Patent: Oct. 27, 2020

(54) SYSTEMS AND METHODS FOR SHARING CONTENT

(71) Applicant: Facebook, Inc., Menlo Park, CA (US)

(72) Inventors: Keith Lanka Peiris, San Francisco, CA (US); Tomasz Zawada, San Francisco, CA (US); Justin David Aguilar, San Francisco, CA (US); Maria Ioveva, Menlo Park, CA (US); Ayca Cakmakli, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 124 days.

(21) Appl. No.: 15/842,725

(22) Filed: Dec. 14, 2017

(65) Prior Publication Data

US 2019/0190872 A1 Jun. 20, 2019

(51) Int. Cl.
*H04L 12/58* (2006.01)
*G06Q 50/00* (2012.01)
*H04L 29/06* (2006.01)
*G06F 3/0484* (2013.01)
*H04W 4/21* (2018.01)

(52) U.S. Cl.
CPC .......... *H04L 51/32* (2013.01); *G06F 3/04842* (2013.01); *G06Q 50/01* (2013.01); *H04L 51/10* (2013.01); *H04L 63/108* (2013.01); *H04L 65/403* (2013.01); *H04W 4/21* (2018.02); *H04L 65/4015* (2013.01)

(58) Field of Classification Search
CPC ....... H04L 51/32; H04L 63/108; H04L 51/10; H04L 65/403; H04W 4/21; G06Q 50/01; G06F 3/04842

USPC .......................................................... 709/206
See application file for complete search history.

(56) References Cited

U.S. PATENT DOCUMENTS

| | | |
|---|---|---|
| 6,212,548 B1 | 4/2001 | DeSimone et al. |
| 8,526,779 B2 | 9/2013 | Simmons |
| 9,264,463 B2 | 2/2016 | Rubenstein |
| 9,294,425 B1 | 3/2016 | Son |
| 9,430,783 B1 | 8/2016 | Sehn |
| 9,537,811 B2 | 1/2017 | Allen |
| 9,906,479 B1 | 2/2018 | Son |
| 9,913,114 B1 | 3/2018 | Wu et al. |

(Continued)

FOREIGN PATENT DOCUMENTS

WO 2016179235 11/2016

OTHER PUBLICATIONS

Williams, "Tile Tabs 14.10," Jul. 18, 2017 (Year: 2017).*

(Continued)

*Primary Examiner* — Chris Parry
*Assistant Examiner* — Weiwei Y Stiltner
(74) *Attorney, Agent, or Firm* — Sheppard Mullin Richter & Hampton LLP

(57) ABSTRACT

Systems, methods, and non-transitory computer-readable media can provide a messaging interface, the messaging interface including a first region and a second region, the first region being segmented from the second region; provide access to one or more ephemeral message threads in the first region, the ephemeral message threads being ranked according to one or more criteria; and provide access to one or more non-ephemeral message threads in the second region, the non-ephemeral message threads being ranked according to one or more criteria.

19 Claims, 21 Drawing Sheets

(56) References Cited

U.S. PATENT DOCUMENTS

| | | |
|---|---|---|
| 9,959,037 B2 | 5/2018 | Chaudhri |
| 10,200,330 B2 | 2/2019 | Steiner |
| 10,243,893 B2 | 3/2019 | Park |
| 10,284,508 B1 | 5/2019 | Allen |
| 10,345,987 B1 | 7/2019 | Andreou |
| 2008/0120383 A1 | 5/2008 | Kumar |
| 2012/0063736 A1 | 3/2012 | Simmons |
| 2014/0282096 A1 | 9/2014 | Rubenstein |
| 2015/0264005 A1 | 9/2015 | Brooks |
| 2015/0271653 A1 | 9/2015 | Brooks |
| 2016/0065520 A1 | 3/2016 | Puranik |
| 2016/0217217 A1 | 7/2016 | Boudville |
| 2016/0234151 A1 | 8/2016 | Son |
| 2016/0295009 A1 | 10/2016 | Torres |
| 2016/0359773 A1 | 12/2016 | Shi |
| 2016/0359779 A1 | 12/2016 | Shi |
| 2017/0034179 A1 | 2/2017 | Carames |
| 2017/0046024 A1* | 2/2017 | Dascola ............ H04M 1/72522 |
| 2017/0070457 A1 | 3/2017 | Sachs |
| 2017/0124713 A1 | 5/2017 | Jurgenson et al. |
| 2017/0126592 A1 | 5/2017 | El Ghoul |
| 2017/0336960 A1* | 11/2017 | Chaudhri ............ G06F 3/04817 |
| 2017/0353416 A1 | 12/2017 | Brooks |
| 2018/0198831 A1 | 7/2018 | Calcaterra |
| 2018/0241705 A1 | 8/2018 | Sarafa et al. |
| 2018/0241871 A1 | 8/2018 | Sarafa |
| 2018/0278564 A1 | 9/2018 | Teixeira de Souza Filho |
| 2018/0351903 A1 | 12/2018 | Allen |
| 2019/0130498 A1 | 5/2019 | Constantinides |
| 2020/0120170 A1 | 4/2020 | Amitay et al. |

OTHER PUBLICATIONS

Panzarino, Matthew, Snapchat Adds Filters, a Replay Function, and for Whatever Reason, Time, Temperature and Speed Overlays, TechCrunch, 2013 [retrieved from https://techcrunch.com/2013/12/20/snapchat-adds-filters-new-font-and-for-some-reason-time-temperature-and-speed-overlays on May 9, 2019].

* cited by examiner

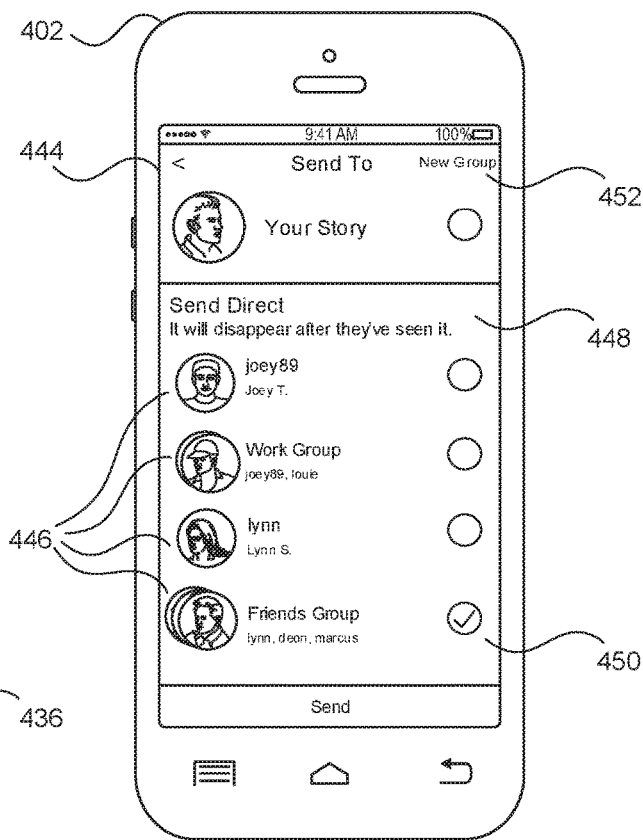
FIGURE 4D
FIGURE 4E

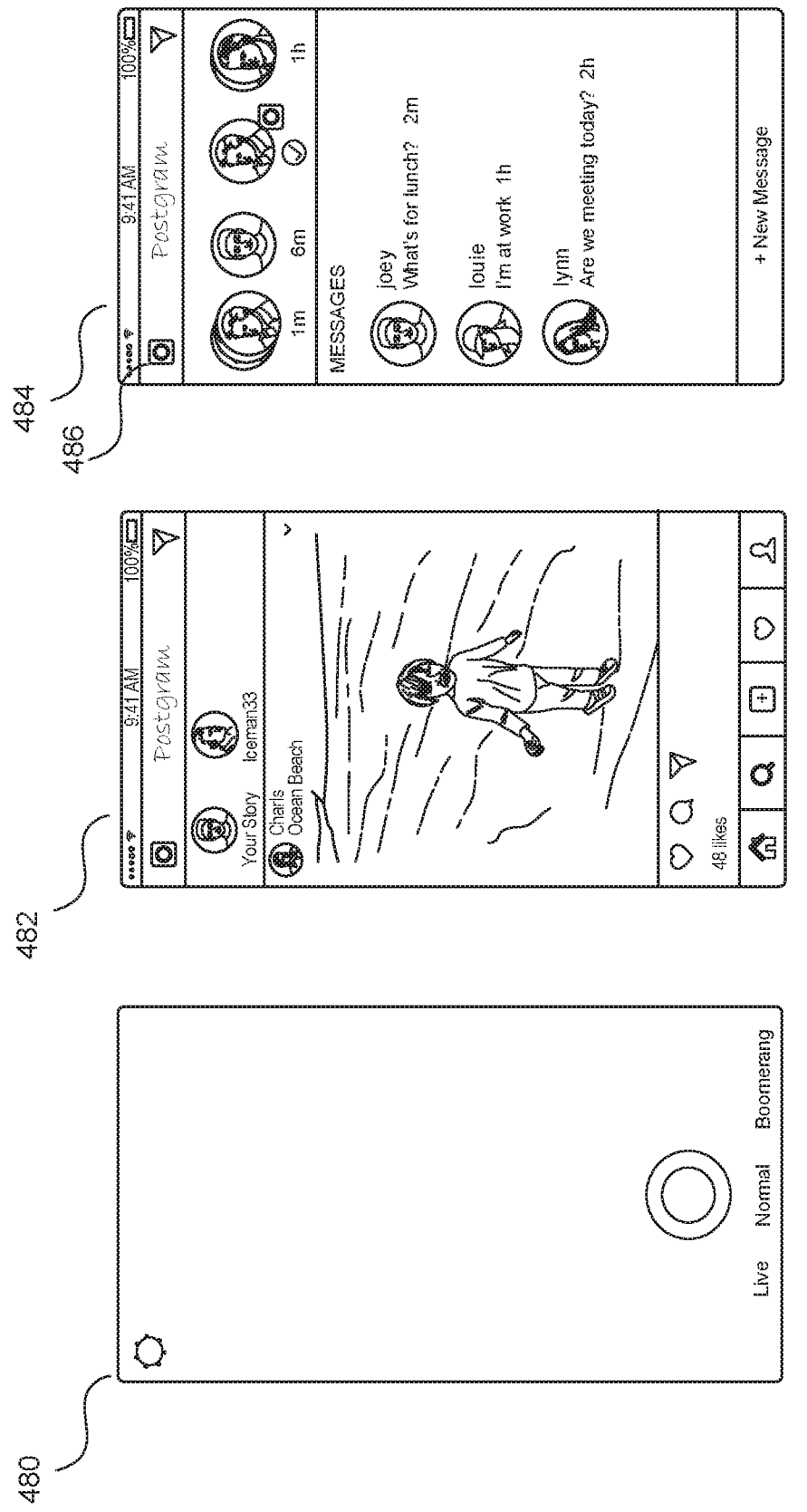

560

Provide a messaging interface that includes at least an option for sending ephemeral messages to users of a social networking system and an option for sending non-ephemeral messages to users of the social networking system
562

Sending a message through the social networking system, wherein the message is sent through an ephemeral message thread or a non-ephemeral message thread as designated by a user
564

FIGURE 5D

SYSTEMS AND METHODS FOR SHARING CONTENT

FIELD OF THE INVENTION

The present technology relates to the field of content sharing. More particularly, the present technology relates to techniques for sharing content with users.

BACKGROUND

Users often utilize computing devices for a wide variety of purposes. Users can use their computing devices to, for example, interact with one another, access media content, share media content, and create media content. In some cases, media content can be provided by members of a social network. The media content can include one or a combination of text, images, videos, and audio. The media content may be published to the social network for consumption by others.

Under conventional approaches, users may post various content items to a social networking system. In general, content items posted by a first user can be included in the respective content feeds of other users of the social networking system, for example, that have "followed" the first user. By following (or subscribing to) the first user, some or all content that is produced, or posted, by the first user may be included in the respective content feeds of the following users. A user following the first user can simply unfollow the first user to prevent new content that is produced by the first user from being included in the following user's content feed.

SUMMARY

Various embodiments of the present disclosure can include systems, methods, and non-transitory computer readable media configured to provide a messaging interface that includes a first option for exchanging ephemeral messages with users of a social networking system and a second option for exchanging non-ephemeral messages with users of the social networking system; determine that a user operating the computing device has selected the first option for sending an ephemeral message; and cause the ephemeral message to be sent through the social networking system.

In some embodiments, the systems, methods, and non-transitory computer readable media are configured to determine that the user has selected an option to share the ephemeral message through an ephemeral content feed of the user; and cause the ephemeral message to be published through the ephemeral content feed of the user.

In some embodiments, the ephemeral message is accessible through the ephemeral content feed for a pre-defined period of time.

In some embodiments, the systems, methods, and non-transitory computer readable media are configured to determine that the user has selected an option to directly send the ephemeral message to one or more recipients; and cause the ephemeral message to be delivered to the one or more recipients through the social networking system.

In some embodiments, the ephemeral message ceases to be accessible to a given recipient after the recipient accesses the ephemeral message.

In some embodiments, a respective seen state is associated between the ephemeral message and each recipient, the seen state indicating whether a given recipient has accessed the ephemeral message.

In some embodiments, the one or more recipients are followers of the user in the social networking system.

In some embodiments, recipients of the ephemeral message are provided an option to add other users to an ephemeral message thread through which the ephemeral message was sent.

In some embodiments, the systems, methods, and non-transitory computer readable media are configured to determine that the user operating the computing device has selected the second option for sending a non-ephemeral message to one or more recipients; and cause the non-ephemeral message to be sent through the social networking system.

In some embodiments, the non-ephemeral message remains accessible to the one or more recipients even after the recipients have accessed the non-ephemeral message.

Various embodiments of the present disclosure can include systems, methods, and non-transitory computer readable media configured to provide a messaging interface, the messaging interface including a first region and a second region, the first region being segmented from the second region; provide one or more options in the first region for sending and receiving ephemeral messages through a social networking system; and provide one or more options in the second region for sending and receiving non-ephemeral messages through the social networking system.

In some embodiments, the first region displays at least one ephemeral message thread.

In some embodiments, the ephemeral message thread corresponds to a group of users, and wherein the ephemeral message thread is represented using at least one avatar corresponding to a user in the group of users.

In some embodiments, the at least one avatar is able to be selected to reveal a menu of options relating to the ephemeral message thread.

In some embodiments, the menu includes an option to replay one or more ephemeral messages sent through the ephemeral message thread.

In some embodiments, the menu includes an option to leave the ephemeral message thread.

In some embodiments, the menu includes an option to reveal respective user seen states for ephemeral messages in the ephemeral message thread.

In some embodiments, the menu includes an option to clear unseen ephemeral messages in the ephemeral message thread.

In some embodiments, ephemeral messages sent through the ephemeral message thread include media content items.

In some embodiments, the second region displays at least one non-ephemeral message thread, the non-ephemeral message thread including one or more text-based messages.

Various embodiments of the present disclosure can include systems, methods, and non-transitory computer readable media configured to provide a messaging interface, the messaging interface including a first region and a second region, the first region being segmented from the second region; provide access to one or more ephemeral message threads in the first region, the ephemeral message threads being ranked according to one or more criteria; and provide access to one or more non-ephemeral message threads in the second region, the non-ephemeral message threads being ranked according to one or more criteria.

In some embodiments, the first region includes at least a first ephemeral message thread that corresponds to a first group of users and a second ephemeral message thread that corresponds to a second group of users.

In some embodiments, the first ephemeral message thread is positioned before the second ephemeral message thread in response to the first ephemeral message thread including at least one unseen ephemeral message.

In some embodiments, the first ephemeral message thread is positioned before the second ephemeral message thread in response to the first ephemeral message thread including at least one unseen ephemeral message that was sent before any unseen ephemeral messages in the second ephemeral message thread.

In some embodiments, the first ephemeral message thread is represented using a first set of avatars that corresponds to the first group of users and wherein the second ephemeral message thread is represented using a second set of avatars that corresponds to the second group of users.

In some embodiments, avatars in the first set of avatars correspond to users in the first group that have sent unseen ephemeral messages through the first ephemeral message thread.

In some embodiments, avatars in the first set of avatars are layered.

In some embodiments, an avatar of a first user is positioned above an avatar of a second user when the first user sent an ephemeral message through the ephemeral message thread before the second user.

In some embodiments, a rank of a non-ephemeral message thread in the second region is determined based on a respective timestamp of the last non-ephemeral message sent through the non-ephemeral message thread.

In some embodiments, the non-ephemeral message thread is represented using one or more avatars corresponding to users included in the non-ephemeral message thread.

Various embodiments of the present disclosure can include systems, methods, and non-transitory computer readable media configured to provide a messaging interface that includes at least an option for sending ephemeral messages to users of a social networking system and an option for sending non-ephemeral messages to users of the social networking system; sending the message through the social networking system, wherein the message is sent through an ephemeral message thread or a non-ephemeral message thread as designated by a user.

In some embodiments, the systems, methods, and non-transitory computer readable media are configured to determine that the message is an ephemeral message being sent to at least one recipient; and cause a camera application interface to be presented, wherein the user is able to capture the ephemeral message using the camera application interface.

In some embodiments, a visual text messaging interface is accessible from the camera application interface.

In some embodiments, the systems, methods, and non-transitory computer readable media are configured to determine that the message is a non-ephemeral message being sent to at least one recipient; and cause a text messaging interface to be presented, the text-messaging interface including a virtual keyboard for creating the non-ephemeral message.

In some embodiments, the interface includes an option to share content items as non-ephemeral messages.

In some embodiments, the message is an ephemeral message being sent to at least one recipient, and wherein the recipient has an option to reply to the ephemeral message with a different ephemeral message.

In some embodiments, the message is an ephemeral message being sent to at least one recipient, and wherein the recipient has an option to reply to the ephemeral message with a non-ephemeral message.

In some embodiments, the non-ephemeral message is sent through the non-ephemeral message thread.

In some embodiments, the systems, methods, and non-transitory computer readable media are configured to determine that the message is a non-ephemeral message being sent to a recipient with whom the user has no follower relationship; and cause a message request to be sent to the recipient.

In some embodiments, the non-ephemeral message is not delivered to the recipient until the message request is accepted by the recipient.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIGS. 4A-K illustrate example interfaces, according to an embodiment of the present disclosure.

FIGS. 5A-D illustrate an example methods, according to an embodiment of the present disclosure.

Figure 1:
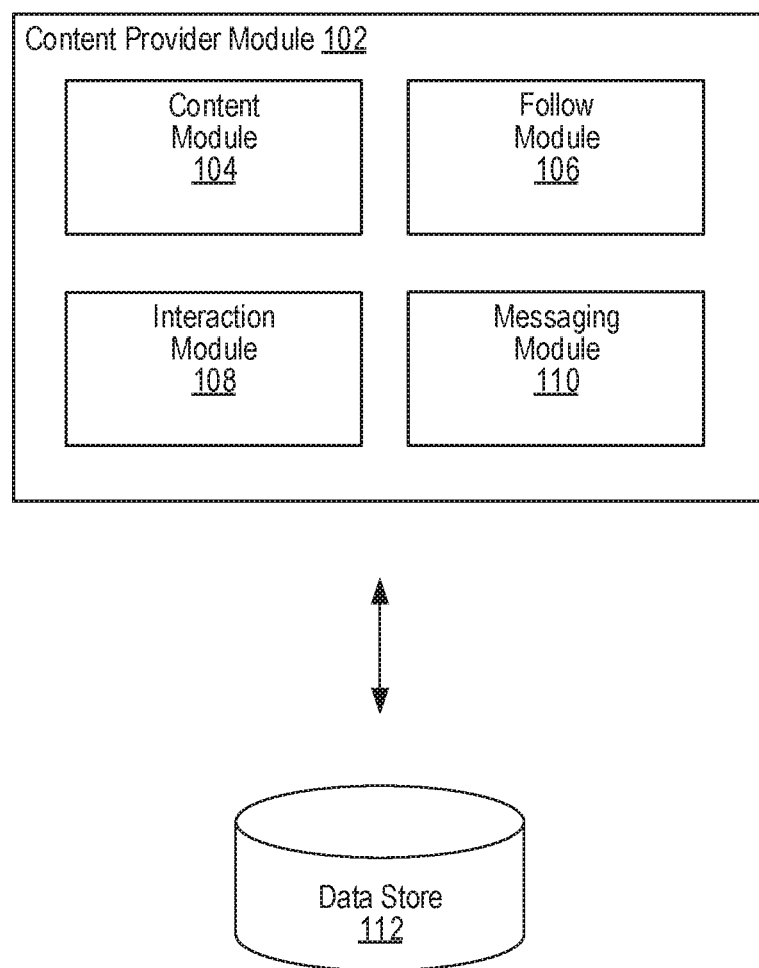
FIG. 1 illustrates an example system including an example content provider module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Sharing Content

As mentioned, users often utilize computing devices for a wide variety of purposes. Users can use their computing devices to, for example, interact with one another, access media content, share media content, and create media content. In some cases, media content items can include postings from members of an online community or platform, such as a social network. The postings may include one or a combination of text, images, videos, and audio. The postings may be published to the social network for consumption by others. Under conventional approaches, media content items posted by a member can be included in a profile of the member on the social network. In other instances, media content items posted by the member can appear in respective media content feeds of other users who are members of the social network. The other users can be connections of the member who posted the media content items.

Under conventional approaches, users can confront various challenges when exchanging messages (e.g., content) with other users through a social networking system. In some instances, users may want to send certain messages without having to worry about those messages being accessible for some extended period of time. Further, having the option to send messages with limited lifespan can help users express themselves more fully when communicating with other users. For example, a user may be more willing to send a video of the user singing if the video is accessible for only a limited period of time. In other instances, users may be less concerned about messages being available indefinitely. Conventional techniques employed by a social networking system often cannot accommodate these dual interests. Accordingly, the user experience can suffer, discouraging users from sharing content through the social networking system.

An improved approach rooted in computer technology overcomes the foregoing and other disadvantages associated with conventional approaches specifically arising in the realm of computer technology. Systems, methods, and computer readable media of the present technology can provide a messaging interface that includes a first option for exchanging ephemeral messages with users of a social networking system and a second option for exchanging non-ephemeral messages with users of the social networking system; determine that a user operating a computing device has selected the first option for sending an ephemeral message; and cause the ephemeral message to be sent through the social networking system. More details relating to the disclosed technology are provided below.

FIG. 1 illustrates an example system 100 including an example content provider module 102, according to an embodiment of the present disclosure. As shown in the example of FIG. 1, the content provider module 102 can include a content module 104, a follow module 106, an interaction module 108, and a messaging module 110. In some instances, the example system 100 can include at least one data store 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user or client computing device. In one example, the content provider module 102 or at least a portion thereof can be implemented as or within an application (e.g., app), a program, or an applet, etc., running on a user computing device or a client computing system, such as the user device 610 of FIG. 6. In another example, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6.

The content provider module 102 can be configured to communicate and/or operate with the at least one data store 112, as shown in the example system 100. The at least one data store 112 can be configured to store and maintain various types of data. For example, the data store 112 can store information describing various content that has been posted by users of a social networking system. In some implementations, the at least one data store 112 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data.

The content module 104 can be configured to provide users with access to content (e.g., media content items) that is available through a social networking system. In some instances, this content can include content items that are posted in content feeds accessible through the social networking system. For example, the content module 104 can provide a first user with access to media content items through an interface that is provided by a software application (e.g., a social networking application) running on a computing device of the first user. The first user can also interact with the interface to post content items to the social networking system. Such content items may include text, images, audio, and videos, for example. For example, the first user can submit a post to be published through the social networking system. In some embodiments, the post can include, or reference, one or more content items. In some embodiments, posts published through the social networking system must include at least one content item.

In various embodiments, other users of the social networking system can access content items posted by the first user. In one example, the other users can access the content items by searching for the first user, for example, by user name through an interface provided by a software application (e.g., a social networking application, browser, etc.) running on their respective computing devices. In some instances, some users may want to see content items posted by the first user in their respective content feed. To cause content items posted by the first user to be included in their respective content feed, a user can select an option through the interface to subscribe to, or "follow", the first user. The follow module 106 can process the user's request by identifying the user as a follower of (or "friend" of) the first user in the social networking system. As a result, some or all content items that are posted by the first user can automatically be included in the respective content feed of the user. If the user decides that they no longer want to see content from the first user in their respective content feed, the user can select an option through the interface to "unfollow" the first user. As a result, the follow module 106 can remove the association between the user and the first user so that content items posted by the first user are no longer included in the content feed of the user.

In some instances, users may want to interact with posted content items. For example, a user may want to endorse, or "like", a content item. In this example, the user can select an option provided in the interface to like the desired content item. The interaction module 108 can determine when a user likes a given content item and can store information describing this relationship. The interaction module 108 can also determine when other forms of user interaction are performed and can store information describing the interaction (e.g., information describing the type of interaction, the identity of the user, the identity of the user that posted the content item, and the content item, to name some examples). For example, the user may want to post a comment in response to a content item. In this example, the user can select an option provided in the interface to enter and post the comment for the desired content item. The interaction module 108 can determine when a user posts a comment in response to a given content item and can store information describing this relationship. Other forms of user interaction can include reacting to a content item (e.g., selecting an option that corresponds to a particular reaction, e.g., happy, sad, angry, etc.) and sharing a content item, to name some examples.

In various embodiments, the messaging module 110 is configured to provide messaging options to users of the social networking system. For example, users can exchange messages with other users of the social networking system. In some embodiments, users can decide whether messages are sent as ephemeral messages or non-ephemeral messages. More details regarding the messaging module 110 will be provided below with reference to FIG. 2.

Figure 2:
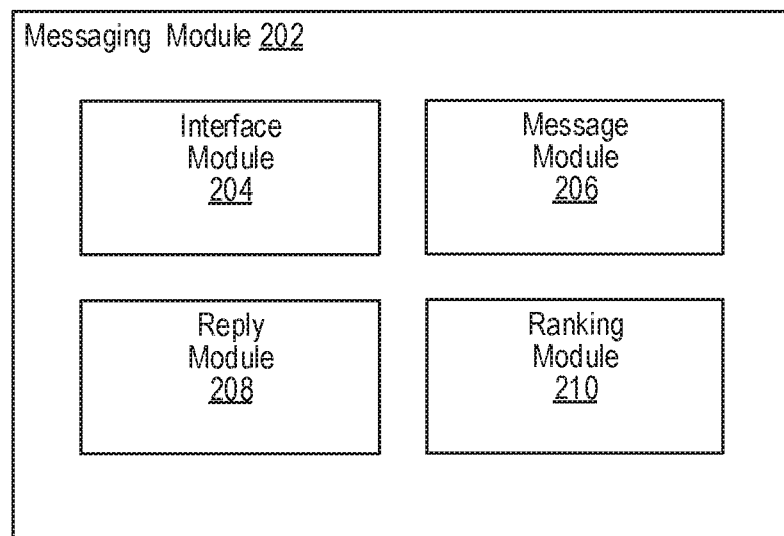
FIG. 2 illustrates an example messaging module, according to an embodiment of the present disclosure.

FIG. 2 illustrates a messaging module 202, according to an embodiment of the present disclosure. In some embodiments, the messaging module 110 of FIG. 1 can be implemented with the messaging module 202. As shown in the example of FIG. 2, the messaging module 202 can include an interface module 204, a message module 206, a reply module 208, and a ranking module 210.

In various embodiments, the interface module 204 can be configured to provide a graphical user interface through which a user can send messages and access received messages. A message may be sent as an ephemeral message or a non-ephemeral message. In some embodiments, an ephemeral message sent to a designated recipient can remain accessible to the recipient until some pre-defined event. For example, the ephemeral message can remain accessible to the recipient until the recipient has accessed (e.g., seen) the ephemeral message. In instances where the ephemeral message was sent to a group of users, the ephemeral message can remain accessible to each recipient in the group until that recipient has accessed (e.g., seen) the ephemeral message. In some embodiments, a non-ephemeral message can be accessible to a designated recipient for an indefinite period of time (e.g., permanently) without having its expiration, if any, being conditioned on some pre-defined event or some pre-defined period of time. In some embodiments, the interface provides access to ephemeral messages through a first region of the interface and access to non-ephemeral messages through a second region of the interface. This segmentation of messages allows users to easily discern ephemeral messages from non-ephemeral messages. More details regarding the interface module 204 will be provided below with reference to FIG. 3A.

In some embodiments, the message module 206 can provide various options for creating and/or sending messages through the social networking system. In some embodiments, ephemeral and non-ephemeral messages can include text or content (e.g., images, videos, or audio), or a combination thereof. As mentioned, a user has the option to send messages as ephemeral messages and/or non-ephemeral messages. In general, ephemeral messages are sent through ephemeral message threads while non-ephemeral messages are sent through non-ephemeral message threads. A message thread for a group of users (e.g., a user and one or more other users) can be created, for example, when an initial message is communicated among users in the group. This message thread can be used to manage communications between the users in the group on an on-going basis. The membership of such message threads can vary over time, for example, as new users are added to the group or when existing users leave the group. As mentioned, in some embodiments, ephemeral messages are managed separately from non-ephemeral messages. Thus, a group of users may have access to an ephemeral message thread through which the users send and receive ephemeral messages while also having access to a non-ephemeral message thread through which the users send and receive non-ephemeral messages. More details regarding the message module 206 will be provided below with reference to FIG. 3B.

In various embodiments, the reply module 208 can provide various options for replying to messages through the social networking system. In some embodiments, the options available for replying to a given message may vary based on whether the message is ephemeral or non-ephemeral. More details regarding the reply module 208 will be provided below with reference to FIG. 3C.

In various embodiments, the ranking module 210 can be configured to organize the presentation of messages (or various aspects of messages). For example, in some embodiments, the ranking module 210 can be configured to rank ephemeral messages that have been directed to a given user. These ephemeral messages can then be presented to the user based on the ranking. In some embodiments, the ranking module 210 can be configured to rank features relating to messages. More details regarding the ranking module 210 will be provided below with reference to FIG. 3D.

Figure 3A:
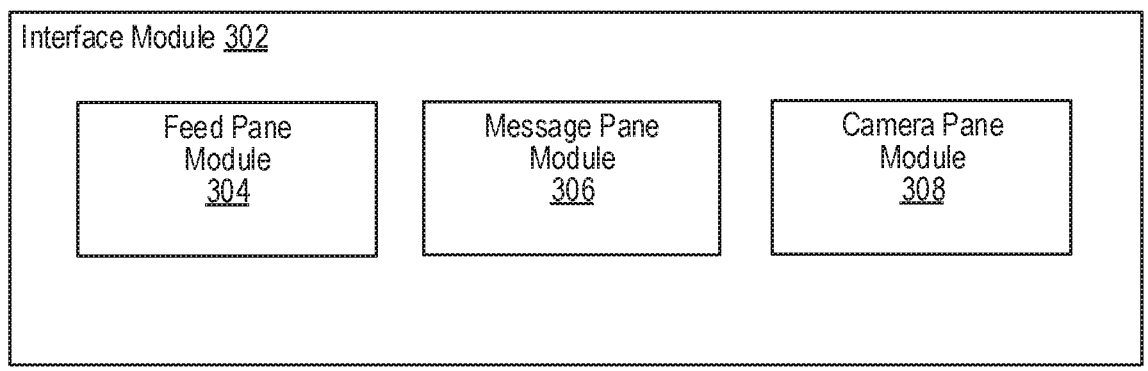
FIG. 3A illustrates an example interface module, according to an embodiment of the present disclosure.

FIG. 3A illustrates an example interface module 302, according to an embodiment of the present disclosure. In some embodiments, the interface module 204 of FIG. 2 can be implemented with the interface module 302. As shown in the example of FIG. 3A, the interface module 302 can include a feed pane module 304, a message pane module 306, and a camera pane module 308.

In various embodiments, the interface module 302 can be configured to provide a graphical user interface through which a user can access content and exchange messages. For example, this interface may be provided through a software application (e.g., social networking application) running on a computing device being operated by the user. In some embodiments, the interface provides various functionality through different panes (or screens) that are accessible through the interface.

For example, in some embodiments, the feed pane module 304 can be configured to provide access to various content (or media) feeds that are accessible through the social networking system. These content feeds may include ephemeral content feeds and/or non-ephemeral content feeds corresponding to users of the social networking system. An ephemeral content feed of a given user can include ephemeral media content items that were shared by that user. In some embodiments, ephemeral messages posted in the user's ephemeral content feed are accessible by other users of the social networking system and/or by other users that are following the user. A non-ephemeral content feed of a given user can include non-ephemeral media content items that were shared by that user. Further, in some embodiments, non-ephemeral messages posted in the user's non-ephemeral content feed are accessible by other users of the social networking system and/or by other users that are following the user.

In some embodiments, the message pane module 306 provides access to a message pane through which the user can send and access messages. For example, the user can access the message pane by selecting an option through the interface and/or by performing a touch screen gesture (e.g., swipe gesture). The message pane can provide the user with access to both ephemeral and non-ephemeral messages. In some embodiments, the message pane module 306 provides access to ephemeral messages through a first region of the message pane and access to non-ephemeral messages through a second region of the message pane. Various additional functionality of the message pane module 306 will be provided below in reference to FIGS. 4A-K.

In some embodiments, the camera pane module 308 provides access to a camera pane through which users can capture various forms of media content items (e.g., images, videos, boomerangs, etc.). For example, the user can access the camera pane by selecting an option through the interface and/or by performing a touch screen gesture (e.g., swipe gesture). In some embodiments, accessing the camera pane causes a camera application to execute on the computing device being operated by the user. In some instances, the camera pane module 308 can automatically activate the camera application when the user selects an option to reply to an ephemeral message. Once activated, the user can interact with the camera application to produce content (e.g., an ephemeral media content item) that can be sent as a response to the ephemeral message. Various additional functionality of the camera pane module 308 will be provided below in reference to FIGS. 4A-K.

Figure 3B:
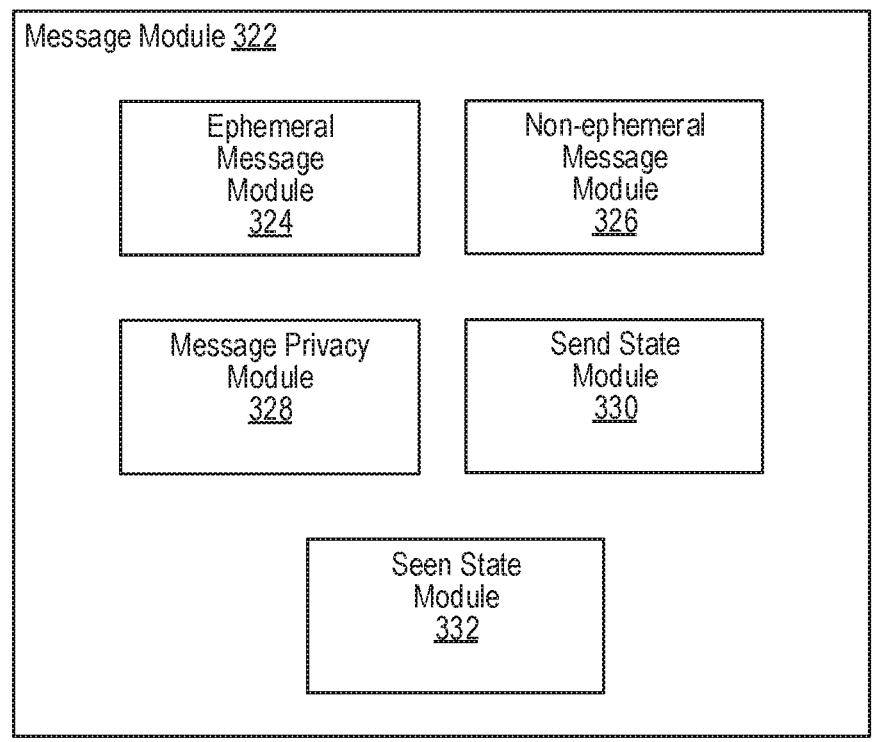
FIG. 3B illustrates an example message module, according to an embodiment of the present disclosure.

FIG. 3B illustrates an example message module 322, according to an embodiment of the present disclosure. In some embodiments, the message module 206 of FIG. 2 can be implemented with the message module 322. As shown in the example of FIG. 3B, the message module 322 can include an ephemeral message module 324, a non-ephemeral message module 326, a message privacy module 328, a send state module 330, and a seen state module 332.

In some embodiments, the ephemeral message module 324 provides functionality for sending and accessing ephemeral messages. For example, a user can select an option to send an ephemeral message. Upon selecting the option, the user can create the ephemeral message and provide the names (or usernames) of one or more recipients of the ephemeral message. After selecting an option to send the ephemeral message, the ephemeral message module 324 can create an ephemeral message thread that manages ephemeral messages exchanged between the user and the one or more recipients. If an ephemeral message thread between the user and the recipients already exists, then the ephemeral message module 324 can send the ephemeral message through the existing ephemeral message thread. The ephemeral message module 324 can regulate access to ephemeral messages. For example, in some embodiments, an ephemeral message sent to a designated recipient can be accessible by the recipient until some pre-defined event. For example, the ephemeral message can remain accessible to the recipient until the recipient has accessed (e.g., seen) the ephemeral message through the social networking system. In instances where the ephemeral message was sent to a group of users, the ephemeral message can remain accessible to each recipient in the group until that recipient has accessed (e.g., seen) the ephemeral message through the social networking system. In some embodiments, an ephemeral message accessed during a given session can continue to be accessed by the user during the same session for some pre-defined period of time. In some embodiments, a session may be defined as a duration of time during which the user accesses an ephemeral message thread through which the ephemeral message was received. In some embodiments, the ephemeral message module 324 restricts the types of content that can be sent as ephemeral messages. For example, in some embodiments, messages being sent as ephemeral messages may be restricted to visual content (e.g., images, videos, graphical text, animated text, etc., and combinations thereof). In such embodiments, at least some of this visual content may be captured using a camera application provided by the interface module 204.

In some embodiments, the non-ephemeral message module 326 provides functionality for sending and accessing non-ephemeral messages. For example, a user can select an option to send a non-ephemeral message. Upon selecting the option, the user can create the non-ephemeral message and provide the names (or usernames) of one or more recipients of the non-ephemeral message. After selecting an option to send the non-ephemeral message, the non-ephemeral message module 326 can create a non-ephemeral message thread that manages non-ephemeral messages exchanged between the user and the one or more recipients. If a non-ephemeral message thread between the user and the recipients already exists, then the non-ephemeral message module 326 can send the non-ephemeral message through the existing non-ephemeral message thread. In some embodiments, a non-ephemeral message can be accessible to a designated recipient for an indefinite period of time (e.g., permanently) without having its expiration, if any, being conditioned on some pre-defined event or some pre-defined period of time. In some embodiments, messages being sent as non-ephemeral messages may be restricted to text-based messages. In some embodiments, content can also be sent as non-ephemeral messages. For example, this content may include content items (e.g., images, videos, etc.) accessible through a media gallery that is stored in (or accessible through) the user's computing device.

In some embodiments, messaging between users may be restricted based on various criteria. For example, in some embodiments, the message privacy module 328 may require that a first user is following a second user before any messages from the second user can be sent to the first user. In some embodiments, the message privacy module 328 may require that the first user and the second user are following one another before any messages can be communicated between the first user and the second user. In some embodiments, such restrictions may be limited to ephemeral messages communicated between the first user and the second user. In some embodiments, non-ephemeral messages from the first user to the second user may be sent to the second user along with a message request. In such embodiments, these non-ephemeral messages can be delivered and made accessible to the second user provided the second user accepts the message request.

In some embodiments, ephemeral and non-ephemeral messages exchanged between users can be assigned respective send states. For example, in some embodiments, a message sent through the social networking system is assigned a timestamp indicating when the message was sent. This timestamp can be shown in a corresponding message thread through which the message was communicated, for example. In some embodiments, the send state module 330 can assign a corresponding state to the sent message. In such embodiments, the state for the sent message may be "delivered" when the message has been delivered to its recipients, "seen" (or "read") when the message has been accessed (or viewed) by a threshold number of the recipients (e.g., one recipient, all recipients, etc.), or "replayed" when the message was re-accessed (or replayed) by a threshold number of the recipients (e.g., one recipient, all recipients, etc.).

In some embodiments, the seen state module 332 can be configured to manage respective seen states for messages exchanged between users. These seen states can be managed differently depending on whether a message is an ephemeral message or a non-ephemeral message.

In some embodiments, seen states for ephemeral messages can be maintained on a per-message basis. For example, in some embodiments, a corresponding seen state can be maintained for each recipient of an ephemeral message. In such embodiments, the seen state can indicate whether the recipient has accessed (or viewed) the ephemeral message. For example, an ephemeral message sent to a first user and a second user can be associated with a first seen state corresponding to the first user and a second seen state corresponding to the second user. These seen states can be used to determine which ephemeral messages still need to be presented to a given user. For example, when a user accesses a given ephemeral message thread, the seen state module 332 can identify ephemeral messages sent through the ephemeral message thread that have not been seen by the user. These unseen ephemeral messages can then be presented to the user, for example, in chronological order. In some embodiments, a seen state corresponding to a given ephemeral message and user is managed using a uniform resource locator (URL) that references the ephemeral message. In such embodiments, a timestamp indicating when the user accessed the ephemeral message can be appended to the URL. In some embodiments, this timestamp is signed using a cryptographic key to ensure its authenticity. Any user attempts to access the ephemeral message after this timestamp will be denied. In instances where the ephemeral message is sent to a group of users, then a separate URL and timestamp can be maintained for each user in the group.

In some embodiments, seen states for non-ephemeral messages can be maintained on a per-thread basis. For example, in some embodiments, a corresponding seen state can be maintained for each non-ephemeral message thread that is accessible to a given user. In such embodiments, the seen state can indicate whether the user has accessed a given non-ephemeral message thread. Thus, for example, the seen state for a non-ephemeral message thread that includes one or more unseen non-ephemeral messages, none of which have been accessed by the user, will indicate that the user has not viewed the messages. In this example, once the user has accessed the non-ephemeral message thread, the seen state will be updated to indicate that the user has viewed messages in the thread even if the user has not viewed all of the messages, such as new messages.

Figure 3C:
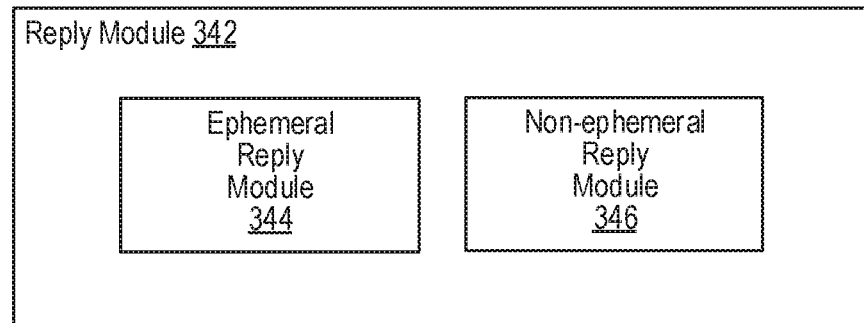
FIG. 3C illustrates an example reply module, according to an embodiment of the present disclosure.

FIG. 3C illustrates an example reply module 342, according to an embodiment of the present disclosure. In some embodiments, the reply module 208 of FIG. 2 can be implemented with the reply module 342. As shown in the example of FIG. 3C, the reply module 342 can include an ephemeral reply module 344 and a non-ephemeral reply module 346.

As mentioned, users typically have the option to reply to messages received from other users. In some embodiments, the options available for replying to a given message can vary based on whether the message is ephemeral or non-ephemeral. For example, when a user receives an ephemeral message, the ephemeral reply module 344 can provide the user with options for responding to the ephemeral message. In some embodiments, the ephemeral reply module 344 provides the user with an option to reply to the ephemeral message with the user's own ephemeral message. In such embodiments, the ephemeral reply module 344 provides the user with an option to create a new ephemeral message, as described above. In some embodiments, the user can generate the ephemeral message by creating visual content (e.g., images, videos, graphical text, animated text, etc., and combinations thereof) that will be provided as the ephemeral message. In some embodiments, at least some of this visual content may be captured using a camera application provided by the interface module 204. In some embodiments, the visual content is created using various tools for sending graphical text responses. For example, graphical text responses may be created using tools for inputting text such as a virtual keyboard. In this example the inputted text can be decorated, for example, by applying different colors, fonts, and/or animations, to name some examples. In some embodiments, the ephemeral reply module 344 provides the user with an option to reply to an ephemeral message with a non-ephemeral message. In such embodiments, the non-ephemeral message will appear in a separate non-ephemeral message thread between the user and recipient(s) of the non-ephemeral message.

In various embodiments, when a first user receives a non-ephemeral message from a second user, the non-ephemeral reply module 346 can provide the first user with options for responding to the non-ephemeral message. In some embodiments, the non-ephemeral reply module 346 provides the first user with an option to reply to the non-ephemeral message with the first user's own non-ephemeral message. In such embodiments, the non-ephemeral reply module 346 provides the first user with an option to create a new non-ephemeral message, as described above. For example, the first user can create and send a new text-based message in response to the received non-ephemeral message. In this example, the text-based message is sent through a corresponding non-ephemeral thread that is created between the first user and the second user. The first user also has the option to send content-based messages in response to the non-ephemeral message. For example, the first user can select an option to access a gallery of content items (e.g., images, videos, etc.) that are available to be shared. These content items may be stored on a computing device being operated by the first user or may otherwise be available to the computing device, for example, through cloud-based storage.

Figure 3D:
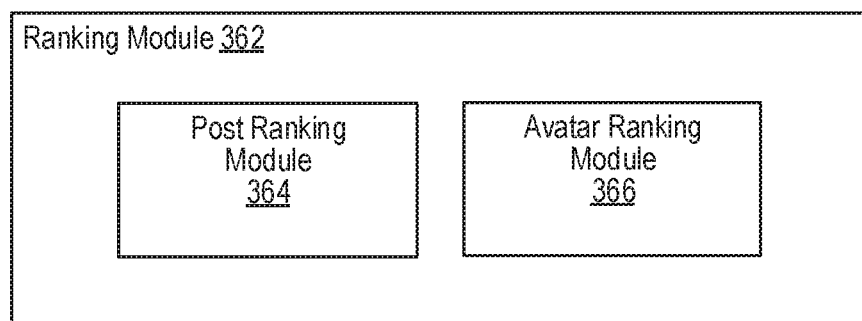
FIG. 3D illustrates an example ranking module, according to an embodiment of the present disclosure.

FIG. 3D illustrates an example ranking module 362, according to an embodiment of the present disclosure. In some embodiments, the ranking module 210 of FIG. 2 can be implemented with the ranking module 362. As shown in the example of FIG. 3D, the ranking module 362 can include a post ranking module 364 and an avatar ranking module 366.

The post ranking module 364 can be configured to determine the order in which messages, or message threads, are shown in interfaces through which users can access received messages. In various embodiments, messages can be ranked differently depending on whether the messages are ephemeral or non-ephemeral. For example, in some embodiments, ephemeral messages that have not been seen by a user are ranked before ephemeral messages that have been already been seen by the user. In such embodiments, the ephemeral messages can further be ranked based on timestamp. Thus, for example, a first unseen ephemeral message having a timestamp that precedes that of a second unseen ephemeral message can be ranked before the second unseen ephemeral message. In some embodiments, non-ephemeral messages are ranked based on timestamp. These approaches for ranking ephemeral and non-ephemeral messages can similarly be applied to ephemeral and non-ephemeral message threads. For example, a first ephemeral message thread can be ranked higher than a second ephemeral message thread if the first ephemeral message thread includes a first unseen ephemeral message having a timestamp that precedes that of a second unseen ephemeral message in the second ephemeral message thread. In one implementation, a first ephemeral message thread can be ranked higher than a second ephemeral message thread if the first ephemeral message thread includes a first unseen ephemeral message having a timestamp that precedes that of all unseen ephemeral messages in the second ephemeral message thread. Similarly, a first non-ephemeral message thread can be ranked before a second non-ephemeral message thread if the first non-ephemeral message thread includes a first non-ephemeral message having a timestamp that precedes that of a second non-ephemeral message in the second non-ephemeral message thread. In one implementation, a first non-ephemeral message thread can be ranked before a second non-ephemeral message thread if the first non-ephemeral message thread includes a first non-ephemeral message having a timestamp that precedes that of all non-ephemeral messages in the second non-ephemeral message thread. In other embodiments, ranking can be opposite to the foregoing examples. In such embodiments, an ephemeral or non-ephemeral message or message thread with a later timestamp can be ranked before an ephemeral or non-ephemeral message or message thread with an earlier timestamp.

The avatar ranking module 366 can be configured to determine the order in which user avatars are shown. For example, in some embodiments, users can select respective avatars. In one example, a user may create an avatar using a content item (e.g., static image, animated image, video, etc.) that is representative of the user. In some embodiments, this avatar can be shown alongside messages sent by the user so that recipients of those messages can easily associate the messages with the user. In some embodiments, a set of avatars corresponding to members of an ephemeral message thread can ranked and presented in an interface through which messages can be accessed. In some embodiments, avatars in the set can be layered based on the ranking. In some embodiments, user avatars can be ranked based on when a given user sent an ephemeral message through the thread. For example, an avatar of a first user that sent an unseen ephemeral message can appear at a higher layer in a set of avatars than an avatar of a second user that sent an unseen ephemeral message after the first user. In this example, when a user that is a member of the thread accesses the thread, the user is presented the ephemeral message sent by the first user followed by the ephemeral message sent by the second user.

Figure 4A:
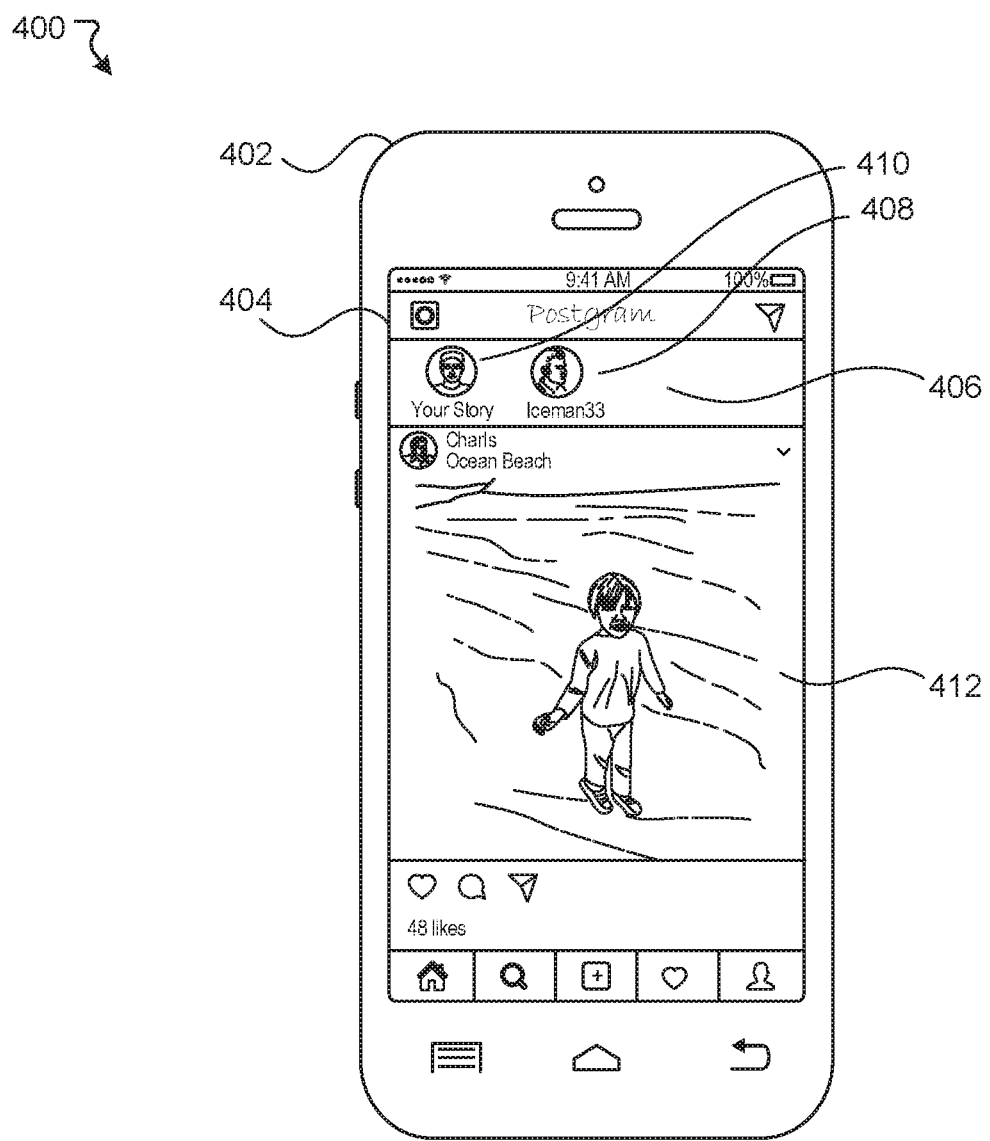

FIG. 4A illustrates an example 400 of an interface 404, according to an embodiment of the present disclosure. In this example, the interface 404 is presented through a display screen of a computing device 402. Further, the interface 404 may be provided through an application (e.g., a web browser, a social networking application, messenger application, etc.) running on the computing device 402 that is configured to interact with a social networking system.

In the example of FIG. 4A, the interface 404 corresponds to a feed pane that provides access to one or more ephemeral content feeds 408, including an ephemeral content feed 410 corresponding to a user operating the computing device 402, through a first region 406 of the interface 404 and access to a non-ephemeral content feed corresponding to the user through a second region 412 of the interface 404. In this example, the non-ephemeral content feed includes a content item that was published in the non-ephemeral content feed.

Figure 4B:
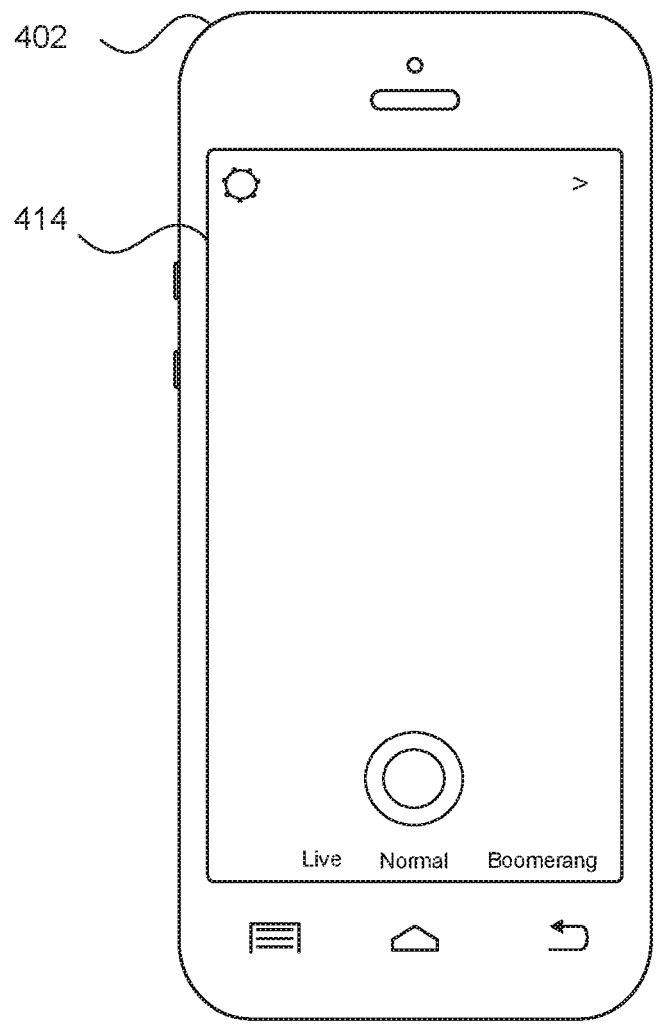

In some embodiments, the user operating the computing device 402 can access a camera pane interface 414 as illustrated in the example of FIG. 4B. The interface 414 may be accessed, for example, by performing a touch screen gesture (e.g., swipe gesture). The camera pane interface 414 can be used to capture various forms of media (e.g., images, videos, boomerangs, etc.). In some embodiments, accessing the camera pane causes a camera application to execute on the computing device 402 being operated by the user. In some instances, the camera pane interface 414 can automatically be presented in response to the user selecting an option to reply to an ephemeral message as described below.

Figure 4C:
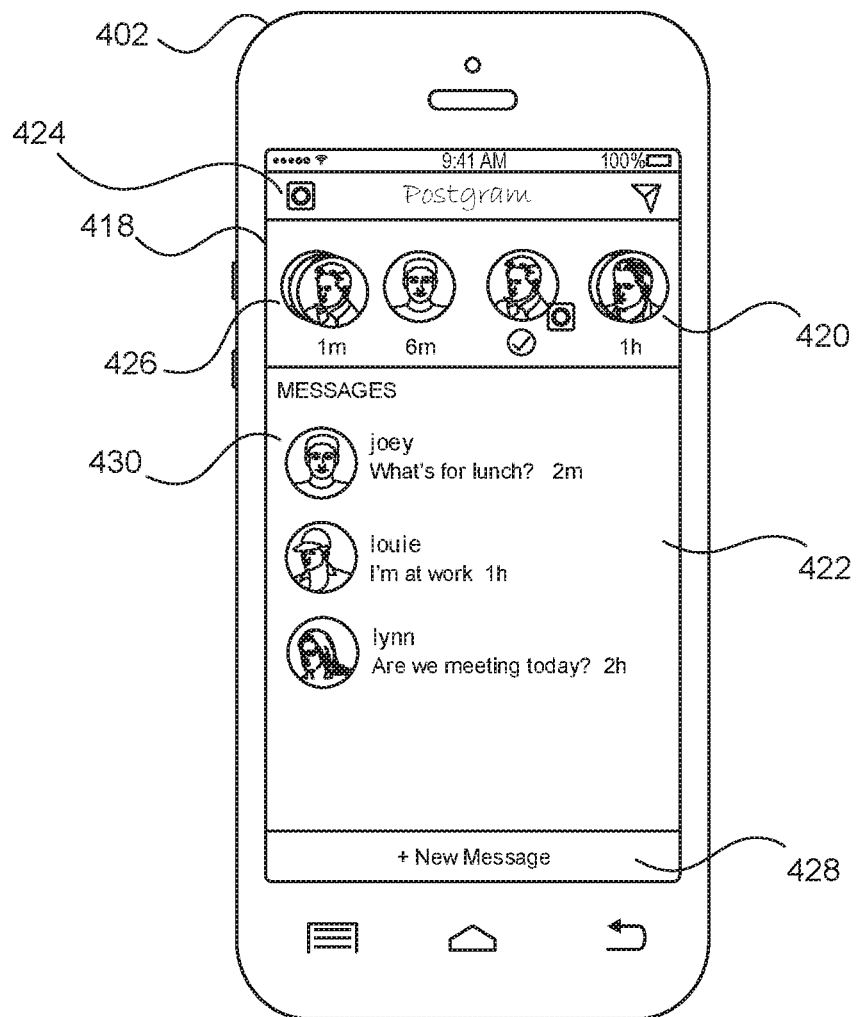

In some embodiments, the user operating the computing device 402 can access a message pane interface 418 as illustrated in the example of FIG. 4C. The interface 418 may be accessed, for example, by performing a touch screen gesture (e.g., swipe gesture). The interface 418 can provide access to a message pane through which the user can send and access messages. In some embodiments, the interface 418 provides access to ephemeral messages through a first region 420 of the interface 418 and access to non-ephemeral messages through a second region 422 of the interface 418.

The user can select an option 424 to send an ephemeral message. Upon selecting the option 424, the user can be presented with the camera pane interface 414. The user can capture one or more content items through the camera pane interface 414, as illustrated in the example of FIG. 4D. When a desired content item 434 has been captured, the user can select an option 436 to share the content item 434 with other users. After selecting the option 436, the user can be presented with an interface 444, as illustrated in the example of FIG. 4E. The user then has several options for sharing the content item 434. For example, the user can share the content item 434 as a story that is published through the user's ephemeral content feed 410. This story can be consumed by other users (e.g., followers) that can access the user's ephemeral content feed 410. In some embodiments, content items (e.g., the content item 434) posted as stories through an ephemeral content feed are accessible by the other users for a 24-hour period. Once this 24-hour period expires, the content items are removed (or made inaccessible) from the ephemeral content feed. In addition to sharing the content item 434 as a story, the user can also direct message the content item 434 as an ephemeral message to other users of the social networking system. In some embodiments, the user can send ephemeral messages only to other users that are following the user through the social networking system. The direct message region 448 of the interface 444 can display avatars 446 of users to which the user has previously sent direct messages. The user can select one or more of these users (or user groups) as recipients of the ephemeral message. In the example of FIG. 4E, the user has selected a group 450 as the recipient of the ephemeral message. If other recipients are intended, the user can select an option 452 to create a new group of recipients. The options for sharing content items are not mutually exclusive. That is, the user can share the content item 434 as a story, as a direct message, or both. As mentioned, the content item 434 will have an ephemeral life span of 24-hours when shared as a story. If sent as an ephemeral message to another user, the content item 434 will be accessible until the other user accesses the ephemeral message. In various embodiments, any user that is a member of an ephemeral message thread can add other users of the social networking system to the thread provided the other users are following the user. In some embodiments, ephemeral messages sent through the message thread are filtered so that no user that is a member of the thread is shown content shared by a person that is blocked by that user.

Figure 4F:
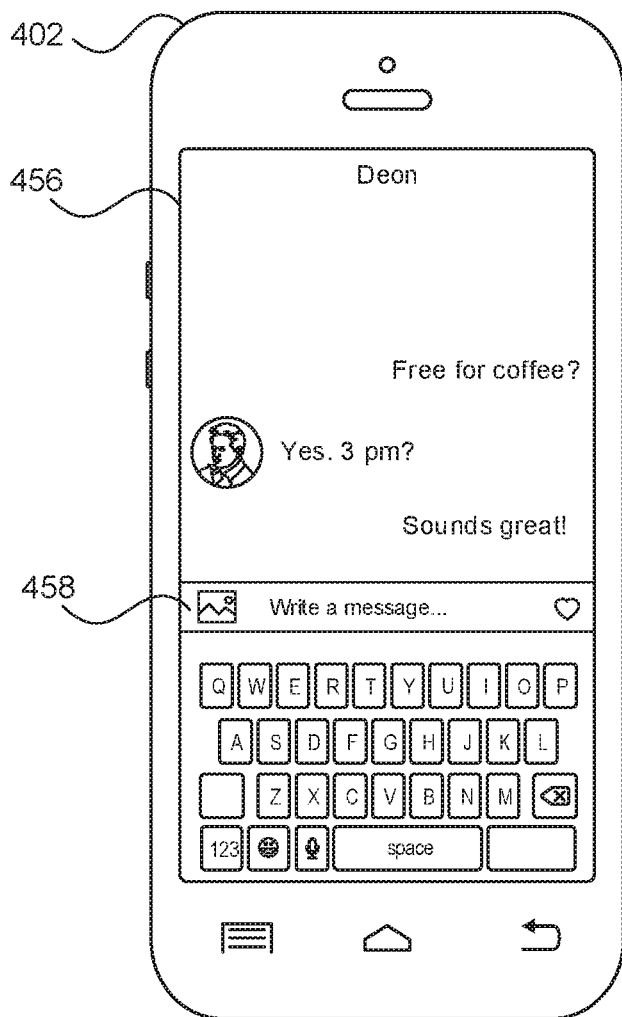

As mentioned, the user can also send non-ephemeral messages through the interface 418 of FIG. 4C. For example, the user can select an option 428 to send a non-ephemeral message. Upon selecting the option 428, the user can be asked to provide names of users that are recipients of the non-ephemeral message. In some embodiments, the user can send non-ephemeral messages to any user of the social networking system. In some embodiments, when sending a non-ephemeral message to a recipient with which the user has no follower relationship, a message request is sent to the recipient to obtain permission for delivering the non-ephemeral message. After specifying the recipient(s), the user is presented with a non-ephemeral messaging interface 456 as illustrated in the example of FIG. 4F. The interface 456 can include a virtual keyboard which can be used to input text-based messages to be sent as non-ephemeral messages. The user also has the option to share content items (e.g., images, videos, etc.) that are accessible through a gallery by selecting an option 458.

Figure 4G:
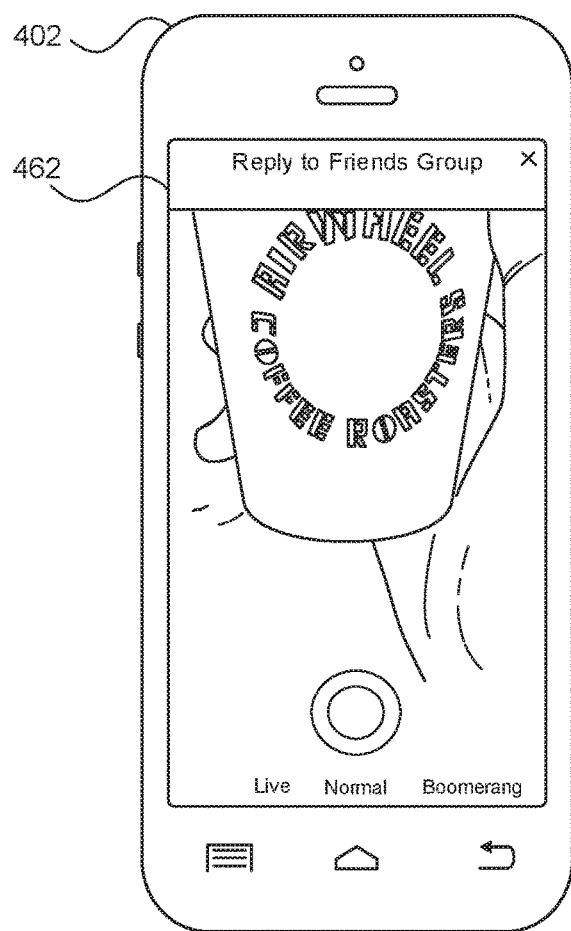
Figure 4H:

As shown in FIG. 4C, the user can also access messages received from other users of the social networking system. For example, the user can access received ephemeral messages through the first region 420 of the interface 418. In one example, the user can access ephemeral messages that were received in an ephemeral message thread by selecting a set of avatars 426 corresponding to users that are members of the thread. Each avatar can each represent a user that is a member of the thread. In some embodiments, the set of avatars 426 can be layered, or ranked, as described above. For example, in some embodiments, the avatar of the user that sent the earliest unseen ephemeral message to the thread is displayed on top of the set of avatars 426. When the set of avatars 426 is selected, the interface 418 can present ephemeral messages that were sent by users in the thread. In some embodiments, these ephemeral messages are replayed chronologically in the order they were received. After viewing the ephemeral messages, the user has the option to send a reply back to the thread. In some embodiments, a camera pane interface 462 is presented as soon as playback of the ephemeral messages ceases as shown in FIG. 4G. The user can use the camera pane interface 462 to capture content to be sent as an ephemeral message to the thread. In some embodiments, while accessing the camera pane interface 462, the user has the option to reply with a text-based ephemeral message as shown in the example of FIG. 4H. The user can access the text reply interface 464, for example, by performing a touch screen gesture (e.g., swipe gesture) while accessing the camera pane interface 462.

Figure 4I:
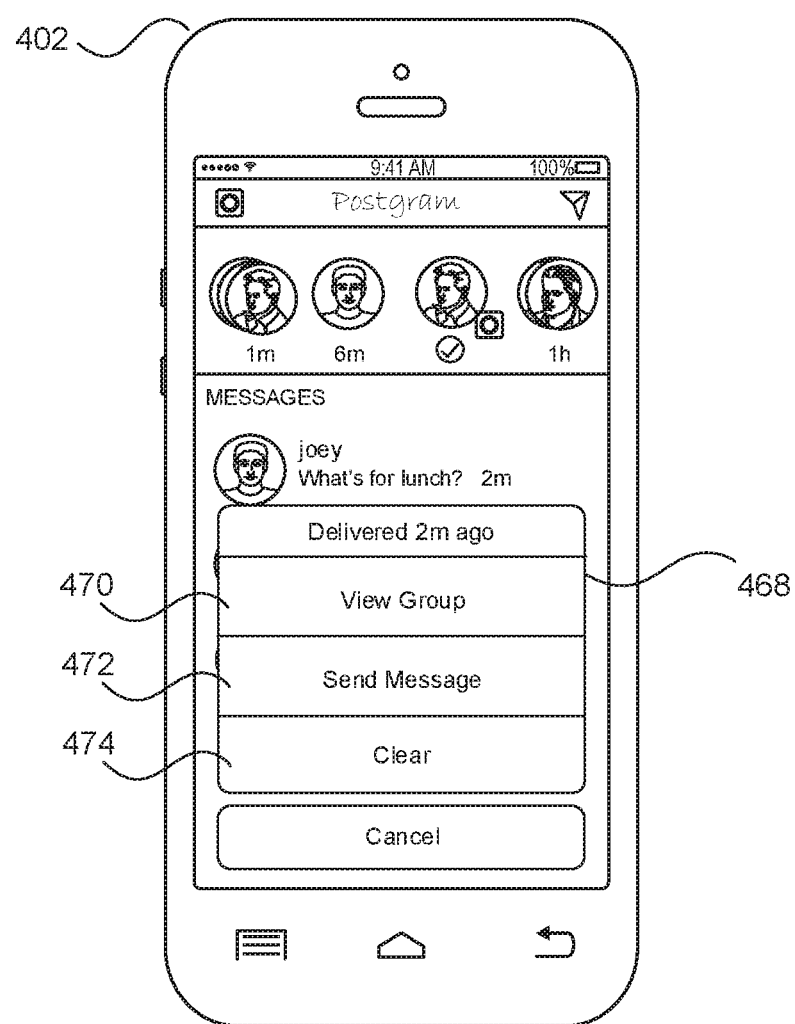

In some embodiments, while accessing the interface 418 of FIG. 4C, the user can long-press the set of avatars 426 to reveal additional options that relate to that ephemeral message thread. For example, as illustrated in the example of FIG. 4I, an options menu 468 can provide the user with an option 470 to view information describing users (e.g., user names, real names, profiles, etc.) that are included in a user group associated with an ephemeral message thread. The menu 468 also includes an option 472 to send a non-ephemeral message through a non-ephemeral message thread that corresponds to the same group of users. Further, the menu 468 includes an option 474 to clear all messages that are available for access through the ephemeral message thread. In some embodiments, the options menu 468 can include an option to replay received ephemeral messages. In some embodiments, when the user sends an ephemeral message through the thread, the menu 468 can include an option that allows the user to see which members of the thread have seen the message, a respective amount of time since a member saw the message, and/or which members subsequently accessed, or replayed, the message. In some embodiments, the menu 468 includes an option to leave the thread. If such option is exercised, the user is no longer provided ephemeral messages that are exchanged through the thread.

Figure 4K:
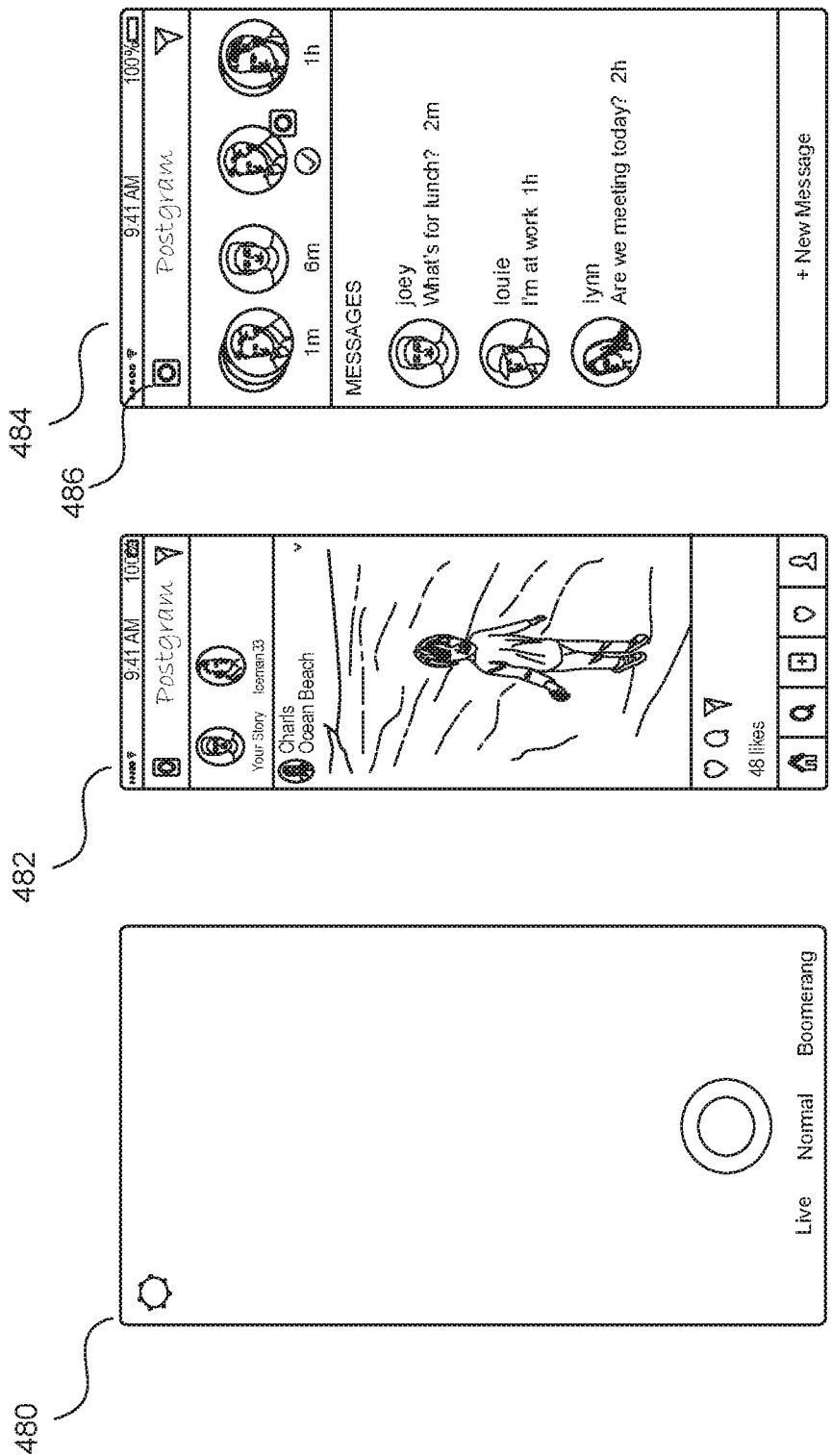

FIG. 4J illustrates an example arrangement of the interfaces that are accessible while operating the application (e.g., a web browser, a social networking application, messenger application, etc.) running on the computing device 402. The interfaces include a camera pane interface 480, a feed pane interface 482, and a message pane interface 484. For example, while accessing the feed pane interface 482, the user can swipe (e.g., swipe to the right) to access the camera pane interface 480. The user can swipe (e.g., swipe to the left) from the camera pane interface 480 to return to the feed pane interface 482. Similarly, the user can swipe (e.g., swipe to the left) from the feed pane interface to access the message pane interface 484. Further, the user can swipe (e.g., swipe to the right) from the message pane interface 484 to return to the feed pane interface 482. In some embodiments, the user can select an option 486 of the message pane interface 484 to automatically cause the camera pane interface 480 to be displayed. In such embodiments, the user can be shown an animation effect that visually transitions from the message pane interface 484, to the feed pane interface 482, and to the camera pane interface 480. In some embodiments, the size of the feed pane interface 482 is reduced when performing the animation effect, as illustrated in the example of FIG. 4K.

Figure 5A:
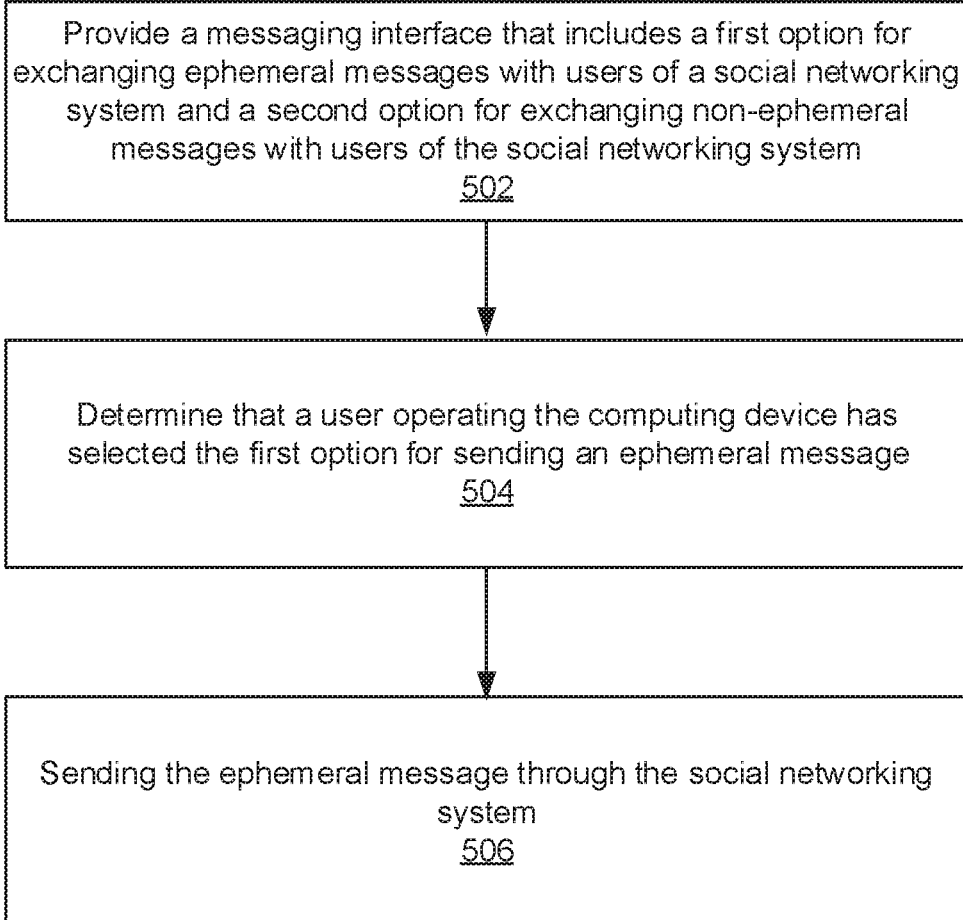

FIG. 5A illustrates an example method 500, according to an embodiment of the present disclosure. It should be appreciated that there can be additional, fewer, or alternative steps performed in similar or alternative orders, or in parallel, within the scope of the various embodiments discussed herein unless otherwise stated.

At block 502, a messaging interface that includes a first option for exchanging ephemeral messages with users of a social networking system and a second option for exchanging non-ephemeral messages with users of the social networking system is provided. At block 504, a determination is made that a user operating the computing device has selected the first option for sending an ephemeral message. At block 506, the ephemeral message is sent through the social networking system.

Figure 5B:
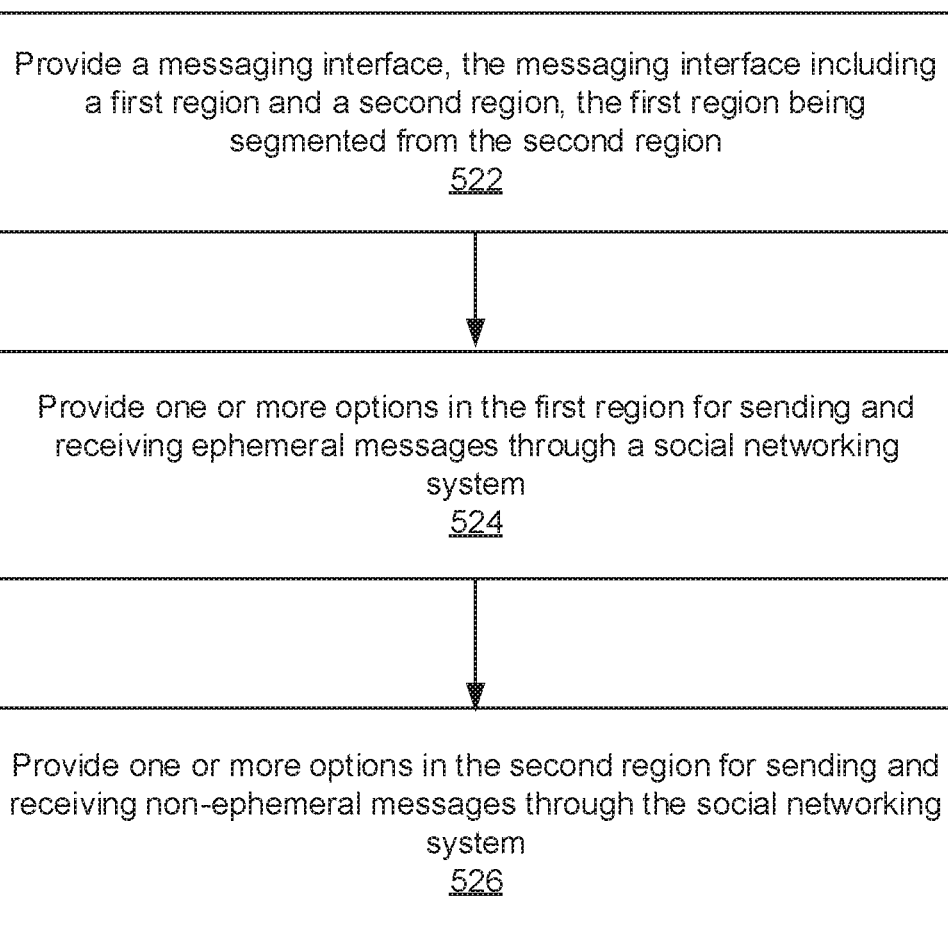

FIG. 5B illustrates an example method 520, according to an embodiment of the present disclosure. It should be appreciated that there can be additional, fewer, or alternative steps performed in similar or alternative orders, or in parallel, within the scope of the various embodiments discussed herein unless otherwise stated.

At block 522, a messaging interface is provided, the messaging interface including a first region and a second region, the first region being segmented from the second region. At block 524, one or more options are provided in the first region for sending and receiving ephemeral messages through a social networking system. At block 526, one or more options are provided in the second region for sending and receiving non-ephemeral messages through the social networking system.

Figure 5C:
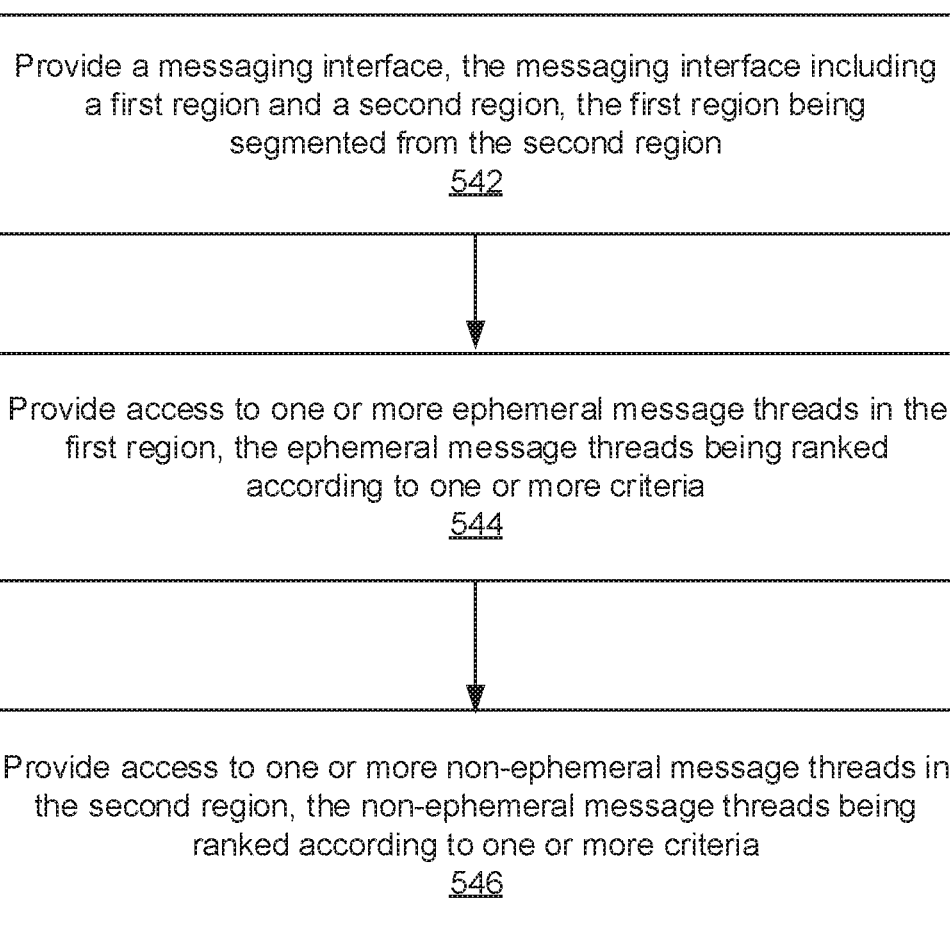

FIG. 5C illustrates an example method 540, according to an embodiment of the present disclosure. It should be appreciated that there can be additional, fewer, or alternative steps performed in similar or alternative orders, or in parallel, within the scope of the various embodiments discussed herein unless otherwise stated.

At block 542, a messaging interface is provided, the messaging interface including a first region and a second region, the first region being segmented from the second region. At block 544, access to one or more ephemeral message threads in the first region is provided, the ephemeral message threads being ranked according to one or more criteria. At block 546, access to one or more non-ephemeral message threads in the second region is provided, the non-ephemeral message threads being ranked according to one or more criteria.

FIG. 5D illustrates an example method 560, according to an embodiment of the present disclosure. It should be appreciated that there can be additional, fewer, or alternative steps performed in similar or alternative orders, or in parallel, within the scope of the various embodiments discussed herein unless otherwise stated.

At block 562, a messaging interface that includes at least an option for sending ephemeral messages to users of a social networking system and an option for sending non-ephemeral messages to users of the social networking system is provided. At block 564, the message is sent through the social networking system, wherein the message is sent through an ephemeral message thread or a non-ephemeral message thread as designated by a user.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
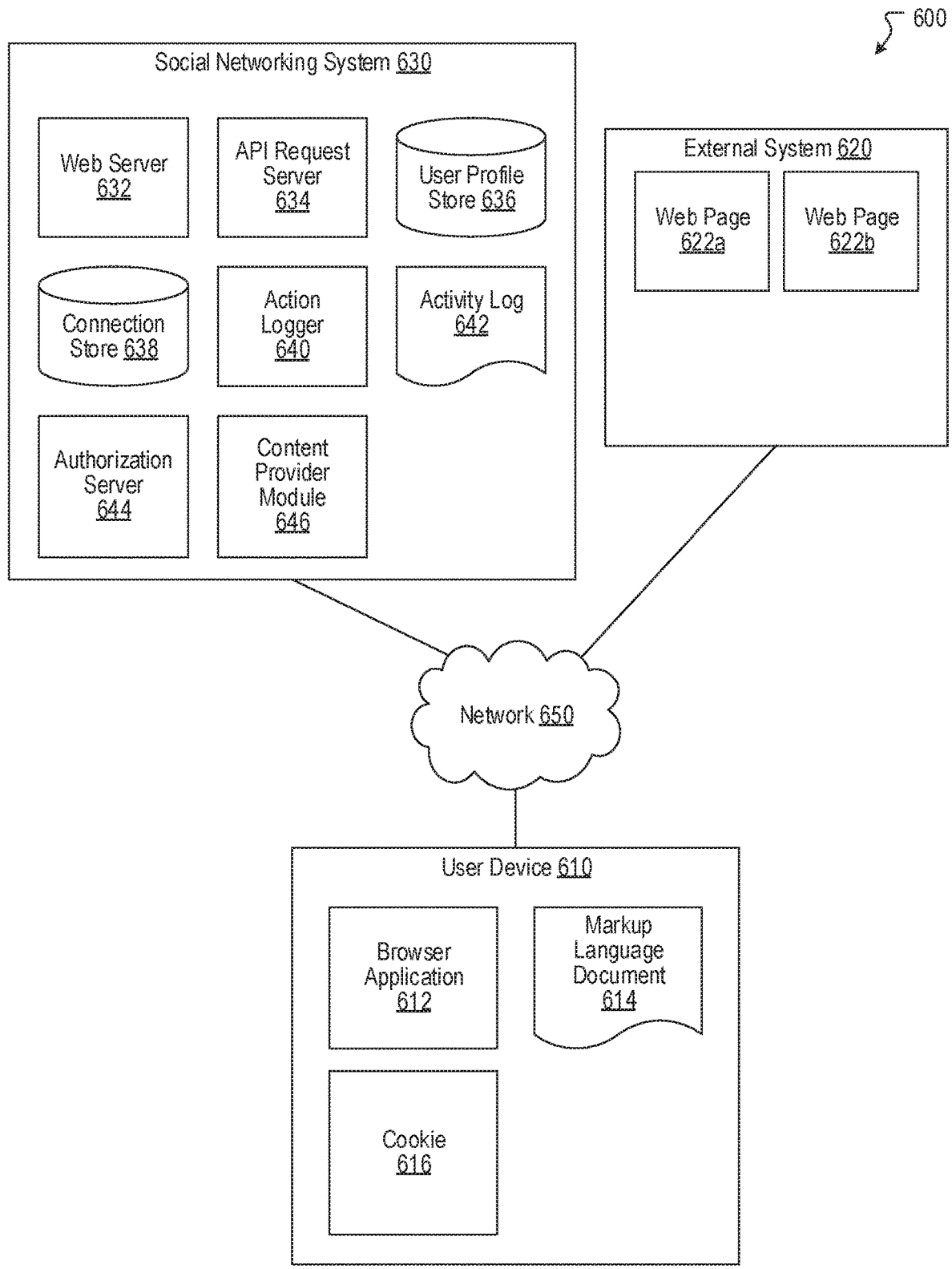
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622*a*, 622*b*, which are communicated to the user device 610 using the network 650. The external system 620 is separate from the social networking system 630. For example, the external system 620 is associated with a first domain, while the social networking system 630 is associated with a separate social networking domain. Web pages 622*a*, 622*b*, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102 of FIG. 1. In some embodiments, the content provider module 646, in whole or in part, is also implemented in the user device 610. As discussed previously, it should be appreciated that there can be many variations or other possibilities.

Hardware Implementation

Figure 7:
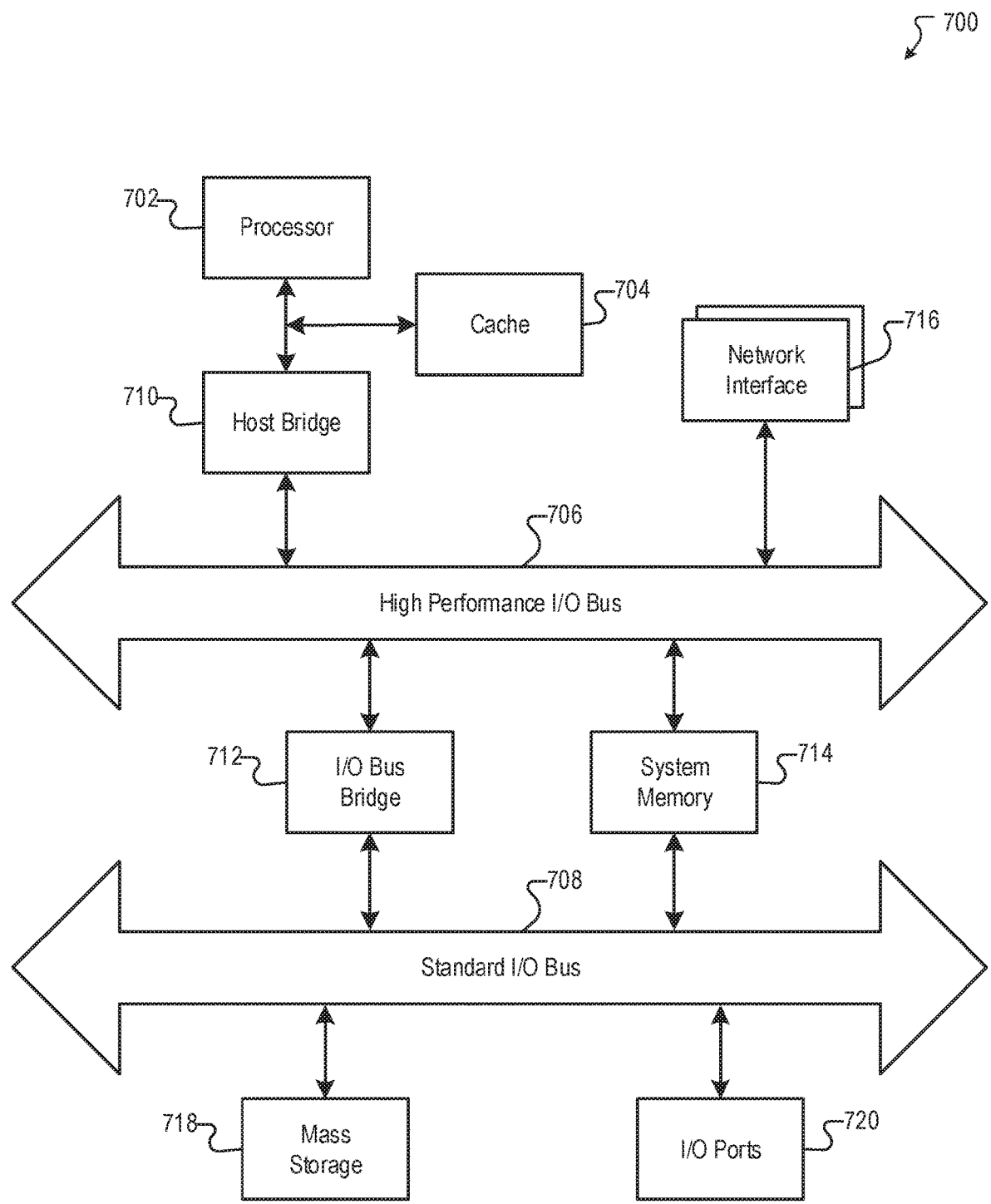
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
providing, by a computing device, a messaging interface, the messaging interface including a first region and a second region, the first region being segmented from the second region;
providing, by the computing device, access to one or more ephemeral message threads in the first region of the messaging interface, the ephemeral message threads being ranked according to one or more criteria, wherein the first region includes at least a first ephemeral message thread associated with a set of layered avatars that represent a group of users, and wherein the set of layered avatars is ordered so that an avatar of a first user is positioned above an avatar of a second user based on an ephemeral message from the first user being sent in the first ephemeral message thread before an ephemeral message from the second user; and
providing, by the computing device, access to one or more non-ephemeral message threads in the second region of the messaging interface, the non-ephemeral message threads being ranked according to the one or more criteria.

2. The computer-implemented method of claim 1, wherein the first region includes a second ephemeral message thread that corresponds to a second group of users.

3. The computer-implemented method of claim 2, wherein the first ephemeral message thread is positioned before the second ephemeral message thread in response to the first ephemeral message thread including at least one unseen ephemeral message.

4. The computer-implemented method of claim 2, wherein the first ephemeral message thread is positioned before the second ephemeral message thread in response to the first ephemeral message thread including at least one unseen ephemeral message that was sent before any unseen ephemeral messages in the second ephemeral message thread.

5. The computer-implemented method of claim 2, wherein the second ephemeral message thread is represented using a second set of avatars that corresponds to the second group of users.

6. The computer-implemented method of claim 5, wherein avatars in the second set of avatars correspond to users in the second group that have sent unseen ephemeral messages through the second ephemeral message thread.

7. The computer-implemented method of claim 5, wherein avatars in the second set of avatars are layered.

8. The computer-implemented method of claim 2, wherein a rank of a non-ephemeral message thread in the second region is determined based on a respective timestamp of the last non-ephemeral message sent through the non-ephemeral message thread.

9. The computer-implemented method of claim 8, wherein the non-ephemeral message thread is represented using one or more avatars corresponding to users included in the non-ephemeral message thread.

10. A system comprising:
at least one processor; and
a memory storing instructions that, when executed by the at least one processor, cause the system to perform:
providing a messaging interface, the messaging interface including a first region and a second region, the first region being segmented from the second region;
providing access to one or more ephemeral message threads in the first region of the messaging interface, the ephemeral message threads being ranked according to one or more criteria, wherein the first region includes at least a first ephemeral message thread associated with a set of layered avatars that represent a group of users, and wherein the set of layered avatars is ordered so that an avatar of a first user is positioned above an avatar of a second user based on an ephemeral message from the first user being sent in the first ephemeral message thread before an ephemeral message from the second user; and
providing access to one or more non-ephemeral message threads in the second region of the messaging interface, the non-ephemeral message threads being ranked according to the one or more criteria.

11. The system of claim 10, wherein the first region includes a second ephemeral message thread that corresponds to a second group of users.

12. The system of claim 11, wherein the first ephemeral message thread is positioned before the second ephemeral message thread in response to the first ephemeral message thread including at least one unseen ephemeral message.

13. The system of claim 11, wherein the first ephemeral message thread is positioned before the second ephemeral message thread in response to the first ephemeral message thread including at least one unseen ephemeral message that was sent before any unseen ephemeral messages in the second ephemeral message thread.

14. The system of claim 11, wherein the second ephemeral message thread is represented using a second set of avatars that corresponds to the second group of users.

15. A non-transitory computer-readable storage medium including instructions that, when executed by at least one processor of a computing system, cause the computing system to perform a method comprising:
   providing a messaging interface, the messaging interface including a first region and a second region, the first region being segmented from the second region;
   providing access to one or more ephemeral message threads in the first region of the messaging interface, the ephemeral message threads being ranked according to one or more criteria, wherein the first region includes at least a first ephemeral message thread associated with a set of layered avatars that represent a group of users, and wherein the set of layered avatars is ordered so that an avatar of a first user is positioned above an avatar of a second user based on an ephemeral message from the first user being sent in the first ephemeral message thread before an ephemeral message from the second user; and
   providing access to one or more non-ephemeral message threads in the second region of the messaging interface, the non-ephemeral message threads being ranked according to the one or more criteria.

16. The non-transitory computer-readable storage medium of claim 15, wherein the first region includes a second ephemeral message thread that corresponds to a second group of users.

17. The non-transitory computer-readable storage medium of claim 16, wherein the first ephemeral message thread is positioned before the second ephemeral message thread in response to the first ephemeral message thread including at least one unseen ephemeral message.

18. The non-transitory computer-readable storage medium of claim 16, wherein the first ephemeral message thread is positioned before the second ephemeral message thread in response to the first ephemeral message thread including at least one unseen ephemeral message that was sent before any unseen ephemeral messages in the second ephemeral message thread.

19. The non-transitory computer-readable storage medium of claim 16, wherein the second ephemeral message thread is represented using a second set of avatars that corresponds to the second group of users.

* * * * *